United States Patent [19]

Spanke

[11] 4,186,827

[45] Feb. 5, 1980

[54] FLUID OPERATED CLUTCH AND BRAKE

[75] Inventor: Edwin A. Spanke, Oak Forest, Ill.

[73] Assignee: Gulf & Western Manufacturing Company, Southfield, Mich.

[21] Appl. No.: 918,101

[22] Filed: Jun. 22, 1978

[51] Int. Cl.² ............................................. F16D 67/04
[52] U.S. Cl. .............................. 192/18 A; 192/48.1; 192/85 AB; 192/87.1
[58] Field of Search .............. 192/18 A, 85 AB, 87.1, 192/87.11, 48.1

[56] References Cited

U.S. PATENT DOCUMENTS

| | | | |
|---|---|---|---|
| 2,089,733 | 8/1937 | Criley | 192/18 A |
| 2,674,356 | 4/1954 | Eason . | |
| 2,838,150 | 6/1958 | Eason . | |
| 3,222,249 | 5/1967 | Klinkenberg et al. | 192/18 |
| 3,321,827 | 5/1967 | Klinkenberg et al. . | |
| 3,468,402 | 9/1969 | Edwards | 192/18 A |
| 3,835,971 | 9/1974 | Spanke et al. | 192/18 A |
| 4,051,933 | 10/1977 | Beneke et al. | 192/18 A |
| 4,078,639 | 3/1978 | Beneke | 192/18 A |
| 4,096,931 | 6/1978 | Whitehurst | 192/18 A |
| 4,122,926 | 10/1978 | Spanke et al. | 192/18 A |

FOREIGN PATENT DOCUMENTS 525124  8/1940  United Kingdom ................. 192/18 A

*Primary Examiner*—H. Hampton Hunter
*Attorney, Agent, or Firm*—Meyer, Tilberry & Body

[57] ABSTRACT

A press drive mechanism is disclosed having primary brake and clutch disc assemblies concentric with respect to the output shaft of the mechanism, and a concentric fluid operated piston-cylinder assembly for alternately actuating the brake and clutch mechanisms. A pre-assembled auxiliary clutch unit is adapted to be removably mounted on one end of the output shaft in order to increase the torque capability of the drive mechanism, and the auxiliary clutch unit includes a fluid operated member cooperable with the primary actuating mechanism to achieve simultaneous operation of the primary and auxiliary clutch units.

20 Claims, 6 Drawing Figures

FLUID OPERATED CLUTCH AND BRAKE

BACKGROUND OF THE INVENTION

This invention relates to the art of transmissions and, more particularly, to a brake and clutch mechanism for use with heavy machinery such as metalworking presses.

Liquid cooled and lubricated clutch and brake drive mechanisms have been provided heretofore for use with heavy machinery such as presses. Such mechanisms generally include an output shaft, a flywheel driven by a motor, a clutch mechanism for selectively engaging and disengaging the flywheel and output shaft, and a brake mechanism for braking rotation of the output shaft when the clutch is actuated to disengage the flywheel and output shaft. A suitable liquid, such as oil, is circulated through the housing of the drive mechanism to lubricate and cool the operating parts thereof including the brake and clutch components during operation of the drive unit. Recent improvements in drive mechanisms of the foregoing character have included structural arrangements in which the flywheel is supported for rotation relative to the housing of the drive mechanism and independent of the output shaft, and the provision of pneumatically or hydraulically actuated brake and clutch operating arrangements concentric with the output shaft at one end of the drive mechanism. Examples of such drive mechanisms are shown in U.S. Pat. No. 3,835,971 issued Sept. 17, 1974 and in pending patent application Ser. No. 746,732 filed Dec. 2, 1976 Now U.S. Pat. No. 4,122,926, dated Oct. 31, 1978, both of which are owned by the Assignee of the present invention. Such drive mechanism structures provide many advantages in connection with the efficiency of clutch and brake operation, accessibility for repair and/or replacement operations, balanced loading of component parts, and structural compactness. However, the clutches in these as well as other fluid actuated mechanisms heretofore provided are designed and constructed to exert a maximum torque at a specific maximum activating force under pneumatic or hydraulic pressure. Accordingly, it becomes necessary to design a number of different clutch sizes in order to cover all press drive torque requirements for which the basic drive mechanism design is adapted to be used. Design engineering is expensive, as is the maintaining of an inventory of different clutch sizes. These expenses are not only encountered by the manufacturer, but also by the customer if different sized units are to be maintained in a standby category.

Accordingly, it becomes desirable to provide a given brake and clutch drive mechanism with the capability for modifying the torque output capacity thereof to avoid the necessity of providing two separate drive mechanism structures and the expenses encountered in connection therewith. Moreover, it is desirable to achieve this capability without increasing the overall size of the basic drive mechanism and without requiring a major disassembly and reassembly operation or the use of structurally or dimensionally modified component parts with respect to the basic structural design of the drive mechanism. In this respect, drive units have been provided heretofore which can be structurally modified to provide different clutch capabilities, but the modifications required are generally of major proportion amounting in effect to two different designs and, additionally, increase the basic unit size dimensionally. For example, such prior multiple clutch capability requires a different or extended output shaft construction and/or a different housing or support arrangement from that required for the basic drive mechanism design. Accordingly, manufacturing as well as inventory costs are not reduced or minimized, and modification of the basic drive mechanism involve a major and time consuming disassembly and reassembly operation.

SUMMARY OF THE INVENTION

In accordance with the present invention, a brake and clutch drive mechanism for a press or the like is provided having a basic structural design which enables increasing or decreasing the output torque capacity selectively and quickly and without altering the overall size of the basic structural design. More particularly, the basic drive mechanism design provides a chamber at one end of the mechanism which is adapted to removably receive a unitary auxiliary clutch package which, when in place in the chamber, is cooperable with the primary brake-clutch unit to increase the output torque capacity of the drive mechanism. The auxiliary clutch package is a unitary self-supporting assembly of component parts interengagable with the output shaft and flywheel of the basic drive mechanism, whereby insertion of the auxiliary clutch assembly into the chamber, or removal therefrom, is readily achieved in a minimum amount of time and with minimum effort. Accordingly, it is only necessary to stock the auxiliary clutch assembly, and it will be appreciated that production and inventory costs are minimized, as is the time required to achieve modification of the basic drive mechanism. Preferably, the primary brake and clutch operating mechanism and the operating mechanism for the auxiliary clutch assembly include structurally interrelated piston and cylinder members which cooperatively interengage upon insertion of the auxiliary clutch assembly into the chamber. These interengaging components define a hydraulic chamber therebetween which provides for simultaneous operation of the primary and auxiliary clutch assemblies during subsequent operation of the drive mechanism. When the auxiliary clutch assembly is installed, it is entirely within the confines of the basic drive mechanism, whereby the physical dimensions of the basic drive unit advantageously remains unchanged.

It is accordingly an outstanding object of the present invention to provide a brake and clutch drive mechanism adapted to selectively receive a unitary auxiliary clutch assembly for increasing the output torque capacity of the drive mechanism.

Another object is the provision of a drive mechanism of the foregoing character which provides selective output torque capacities for a given drive mechanism design without structurally modifying the operating components of the basic design.

Yet another object is the provision of a drive mechanism of the foregoing character wherein change from one output torque capacity to the other can be achieved with minimum effort and in a minimum amount of time.

Still another object is the provision of a drive mechanism of the foregoing character in which the operating mechanisms of the auxiliary clutch assembly and the primary brake and clutch assemblies of the drive mechanism are structurally interrelated to facilitate the assembly of the auxiliary clutch assembly in the drive mechanism and the subsequent simultaneous actuation of the primary and auxiliary clutch assemblies.

A further object is the provision of a drive mechanism of the foregoing character in which the basic drive mechanism is provided with a chamber adapted to receive the auxiliary clutch assembly and which auxiliary clutch assembly when in the chamber, cooperatively interengages the flywheel and output shaft of the drive mechanism and the operating mechanism for the primary clutch and brake assemblies so as to be operatively associated with the basic drive mechanism.

Yet a further object is the provision of a drive mechanism of the foregoing character in which the auxiliary clutch assembly is a preassembled, self-supporting unitary structure which is operatively interengaged with the basic drive mechanism upon insertion into the chamber thereof and which, when so inserted, is fully within the dimensional confines of the basic drive mechanism.

BRIEF DESCRIPTION OF THE DRAWINGS

The foregoing objects, and others, will in part be obvious and in part pointed out more fully hereinafter in conjunction with the written description of a preferred embodiment of the invention shown in the accompanying drawings in which.

BRIEF DESCRIPTION OF THE PREFERRED EMBODIMENT

Figure 1:
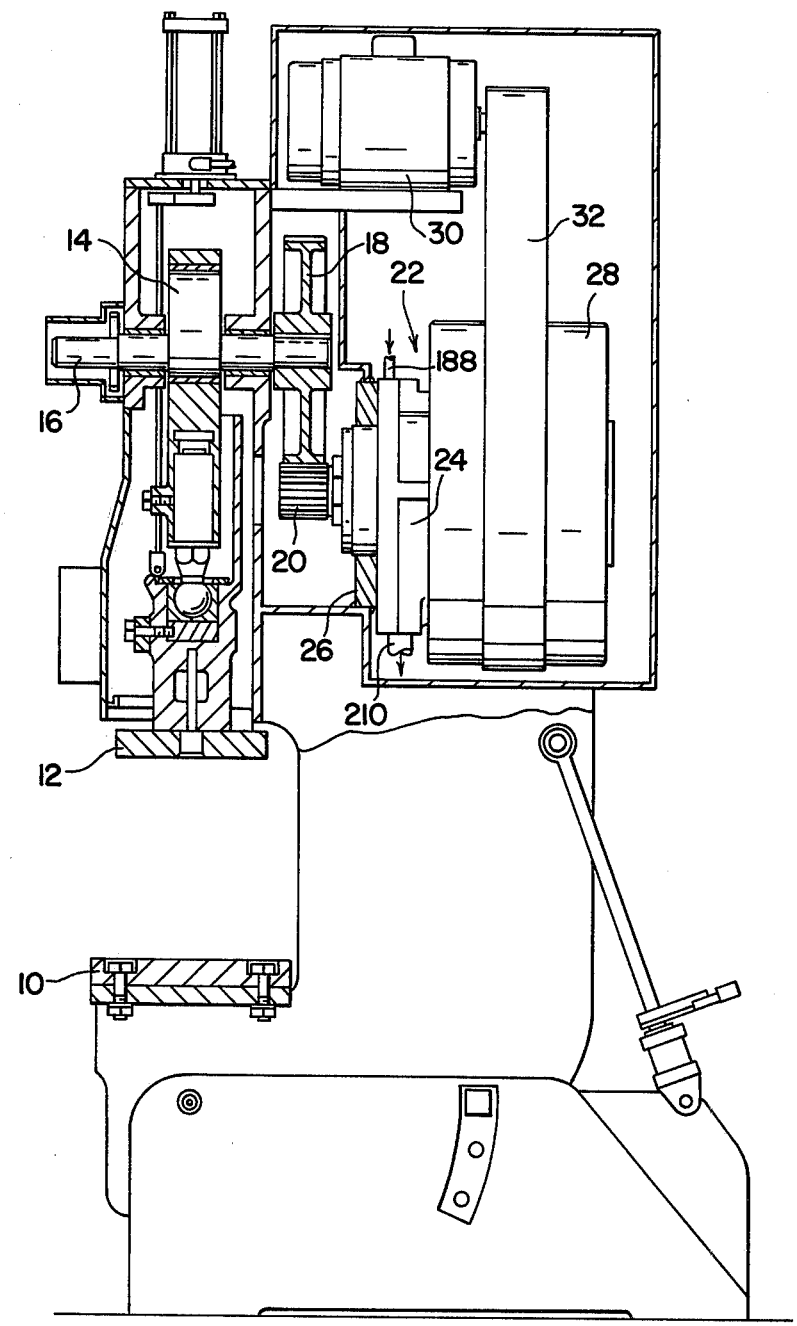
FIG. 1 is a side elevation view, partially in section, of a press and illustrating a drive mechanism of the present invention mounted thereon.

Referring now in greater detail to the drawings wherein the showings are for the purpose of illustrating a preferred embodiment of the present invention only and not for the purpose of limiting the invention, a metalworking press is illustrated in FIG. 1 of the drawing which includes a frame supporting a fixed work supporting platen 10 and a reciprocable tool supporting platen 12. The tool supporting platen is adapted to be reciprocated in a well known manner by means of a rotatable crank 14 having a shaft 16 which is supported for rotation by the press frame. Shaft 16 is provided on one of its opposite ends with a drive gear 18, whereby rotation of gear 18 rotates crankshaft 14 to impart reciprocating motion to tool support platen 12.

Gear 18 is adapted to be rotated by a pinion gear 20 which is coupled to the output shaft of a clutch-brake drive mechanism 22 of the present invention. Drive mechanism 22 includes a housing 24 having a peripheral mounting flange by which the drive mechanism is removably interconnected with a mounting flange 26 of the press frame. Further, drive mechanism 22 includes a flywheel 28 rotatably supported by housing 24 as described more fully hereinafter and adapted to be driven by a suitable motor 30 through a drive belt 32.

Figure 2:
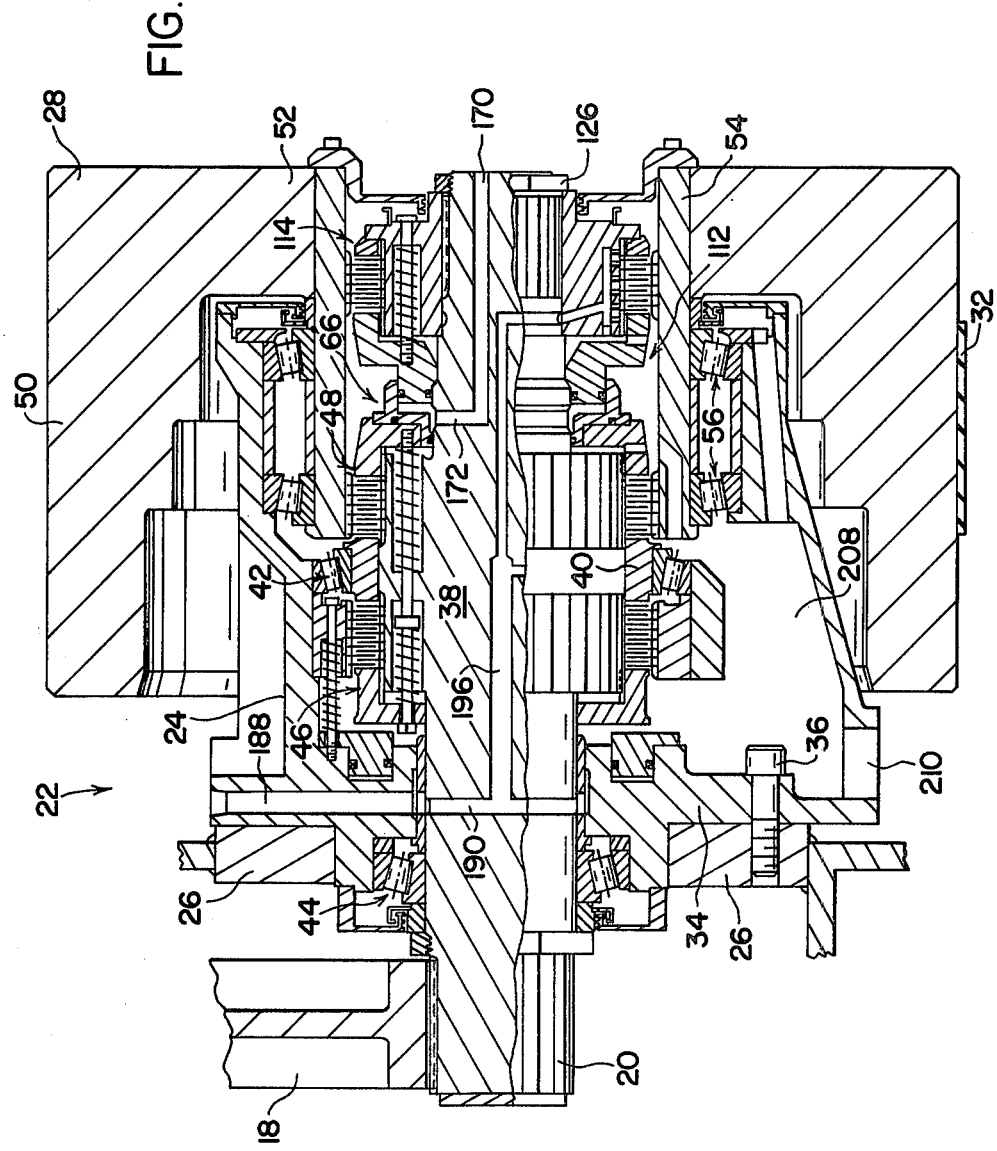
FIG. 2 is an elevational view, in section, of the drive mechanism illustrated in FIG. 1.
Figure 3:
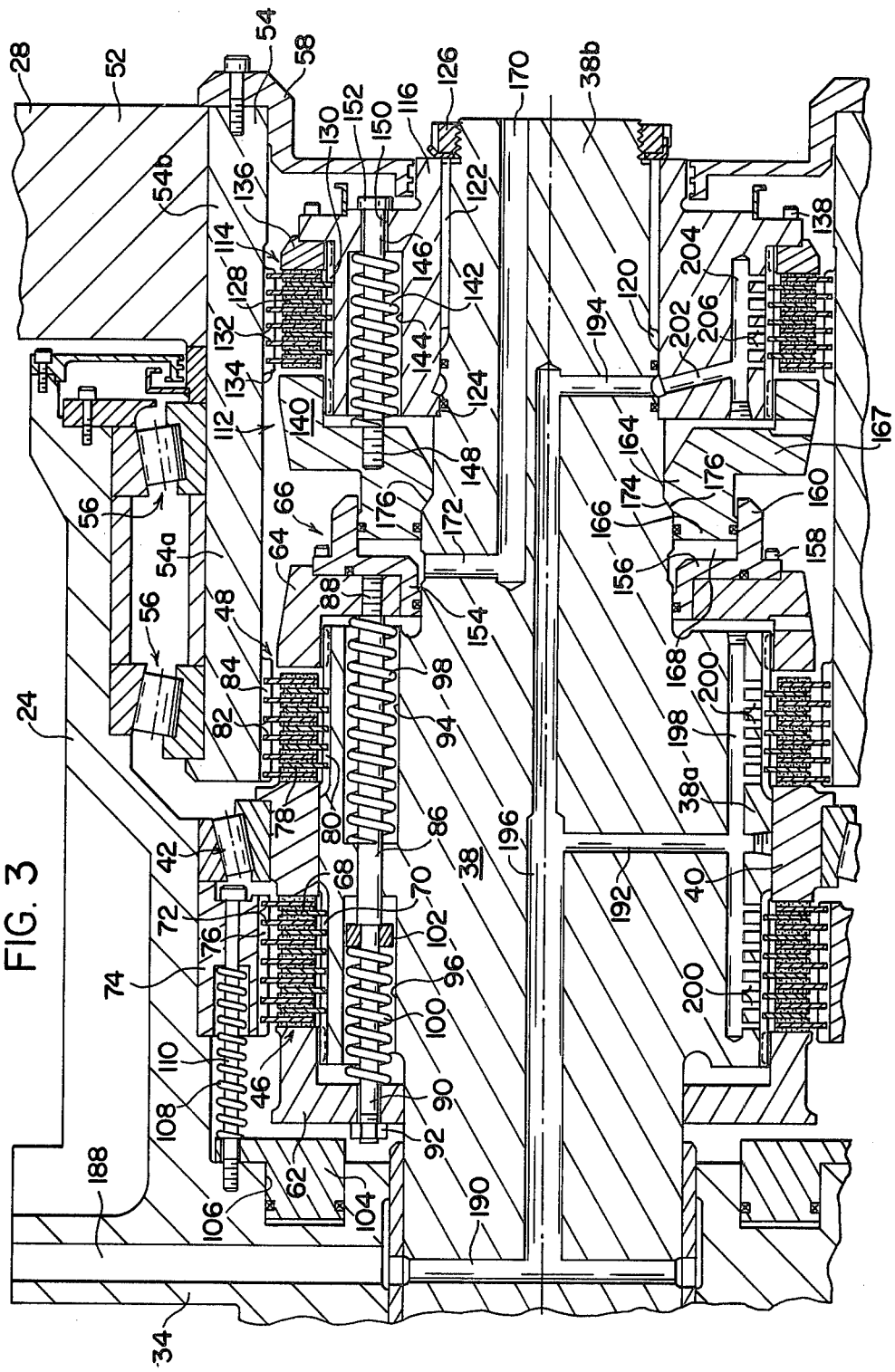
FIG. 3 is an elevation view, in section, of the primary clutch and brake and auxiliary clutch units of the drive mechanism.

The general arrangement of the component parts of drive mechanism 22 is best illustrated in FIGS. 2 and 3 of the drawing. In this respect, housing 24 includes a radially extending wall portion 34 for releaseably interconnecting the drive unit with the press frame such as by the use of bolts 36 extending through wall 34 and into threaded engagement with corresponding openings in press flange 26. Drive mechanism 22 further includes an output shaft 38 supported within housing 24 for rotation relative thereto. More particularly, shaft 38 is provided intermediate its opposite ends with an abutment plate 40 which is splined or otherwise interconnected with shaft 38 for rotation therewith and which serves as the abutment plate for the primary brake and clutch assemblies of the drive mechanism as set forth more fully hereinafter. A roller bearing assembly 42 is interposed between housing 24 and abutment plate 40, and a roller bearing assembly 44 is interposed between housing 24 and shaft 38 adjacent one end of housing 24, whereby shaft 38 is supported for rotation relative to housing 24 by bearing assemblies 42 and 44.

The basic drive mechanism further includes a primary brake assembly 46 on one side of the abutment plate 40 and a primary clutch assembly 48 on the opposite side of the abutment plate, the structure of which brake and clutch assemblies are described hereinafter. Flywheel 28 includes a cylindrical outer portion 50 surrounding the corresponding end of housing 24, a radially extending end portion 52, and a sleeve 54 extending axially inwardly of the corresponding end of housing 24 in surrounding relationship with respect to shaft 38. Roller bearing assemblies 56 are interposed between flywheel sleeve 54 and housing 24 to support the flywheel for rotation relative to the housing and shaft 38. Flywheel portion 52 is splined or otherwise engaged with sleeve 54 for rotation therewith, and an end plate 58 is bolted to the outer end of sleeve 54 to retain the flywheel in axially mounted relationship with respect to sleeve 54. As described more fully hereinafter, rotation of flywheel 28 is adapted to impart rotation to shaft 38 through primary clutch assembly 48 and, upon disengagement of the primary clutch assembly, the primary brake assembly is actuated to stop rotation of shaft 38.

The primary brake and clutch assemblies include corresponding primary brake and clutch presser members 62 and 64, respectively, in the form of annular rings axially displaceable relative to shaft 38 and toward and away from the corresponding side of abutment plate 40. Displacement of presser members 62 and 64 is by means of a brake and clutch operating mechanism to be described more fully hereinafter and which, in the embodiment shown, includes a fluid actuated cylinder member 66 surrounding shaft 38 and bolted or otherwise secured to primary clutch presser member 64. Primary brake assembly 46 includes a plurality of brake discs 68 surrounding intermediate portion 38a of shaft 38 and interengaged therewith such as by splined interconnections 70, and a plurality of brake discs 72 interposed between discs 68 and having their outer edges interconnected with a support ring 74 by means of splined interconnections 76. Discs 68 and 72 are disposed between brake presser member 62 and the corresponding side of abutment plate 40 and, as is well known, the splined interconnections enable discs 68 and 72 to be axially slidable relative to the housing and shaft 38. The splined interconnection also provide for discs 68 to be rotatable with the shaft and for discs 72 to be fixed against rotation with the shaft. Primary clutch assembly 48 includes a plurality of discs 78 surrounding intermediate portion 38a of shaft 38 and interengaged therewith such as by splined interconnections 80, and a plurality of discs 82 interposed between discs 78 and interengaged with flywheel sleeve 54 by means of splined interconnections 84. Discs 78 and 82 are disposed between clutch presser member 64 and the corresponding side of abutment plate 40 and, in a manner similar to the primary brake assembly, splined interconnections 80 and 84 permit axial displacement of discs 78 and 82 relative to shaft 38 and flywheel sleeve 54. Moreover, the splined interconnections provide for discs 78 to rotate with the shaft and for discs 84 to rotate with flywheel sleeve 54.

Primary brake presser member 62 and primary clutch presser member 64 are interconnected by means of a plurality of rods 86 having ends 88 threaded or otherwise interconnected with primary clutch presser members 64 for displacement of rods 86 therewith. The opposite ends 90 of rods 86 extend loosely through corresponding openings in primary brake presser member 62 and receive nuts 92 thereon. Intermediate portion 38a of shaft 38 is provided with passageways extending axially therethrough for rods 86, and each passageway includes aligned recesses 94 and 96 through which the corresponding rod 86 extends. Recesses 94 and 96 receive biasing springs 98 and 100, respectively. Each spring 98 has an inner end engaging the inner end of recess 94 and an outer end engaging primary clutch presser member 64, whereby springs 98 operate to bias the primary clutch presser member away from the corresponding side of abutment member 40. Each spring 100 has an inner end engaging a stop washer 102 on rod 86 and an outer end engaging primary brake presser member 62. Accordingly, it will be appreciated that springs 100 operate to bias brake presser member 62 against nuts 92 on ends 90 of rods 86. It will be further appreciated that the openings in presser member 62 through which ends 90 of the rods extend permit the primary brake presser member to be displaced axially of the rods in the direction toward ends 88 thereof.

From the foregoing description, it will be understood that engagement of the primary clutch is achieved by displacing primary clutch presser member 64 axially of shaft 38 toward abutment plate 40 so as to engage primary clutch discs 78 and 82 thereagainst. Springs 100 bias brake presser member 62 against nuts 92 on rods 86 which are displaced with clutch presser member 64. Accordingly, the brake presser member is displaced away from abutment plate 40 to disengage the primary brake. With the primary clutch so engaged and the brake released, rotation of the flywheel imparts rotation to shaft 38 through the primary clutch assembly. Upon release of the actuating force for the primary clutch, springs 98 bias primary clutch presser member 64 away from abutment plate 40 to disengage the primary clutch. Simultaneously, springs 98 operate through rods 86 to displace primary brake presser member 62 toward the corresponding side of abutment plate 40 so as to engage primary brake discs 68 and 72 against the abutment plate and thus engage the primary brake. Upon release of the primary clutch flywheel 28 rotates relative to shaft 38, and engagement of the primary brake stops rotation of shaft 38 relative to housing 24.

Often, it is desirable to stop rotation of the flywheel simultaneous with the stopping of rotation of shaft 38. In the embodiment shown this is achieved by means of an annular auxiliary brake actuating piston 104 axially reciprocably received in an annular cylinder 106 provided in housing end wall 34. Hydraulic fluid under pressure is adapted to be received behind piston 104 from a suitable source, not shown, to displace piston 104 axially toward primary brake presser member 62 when the primary brake is engaged. Such displacement of the auxiliary piston is against the bias of a plurality of springs 108 surrounding guide rods 110 extending through support ring 74 and into the housing end wall. When piston 104 is displaced into engagement with primary brake presser member 62, the primary clutch can be actuated to simultaneously engage the clutch and thus stop rotation of flywheel 28. More particularly, actuation of the primary clutch with the brake presser member held in braking position by piston 104 is enabled by the sliding connection between rods 86 and primary brake presser member 62 at ends 90 of the rods. Therefore, when primary clutch presser member 64 is displaced toward abutment plate 40, rods 86 are displaced therewith and relative to the brake presser member. This displacement of rods 86 relative to brake presser member 62 compresses springs 100. Upon removal of the fluid pressure from behind auxiliary brake actuating piston 104, springs 108 bias the auxiliary piston axially away from primary brake presser member 62, and the bias of springs 100 returns brake presser member 62 to its position against nuts 92 on rods 86. Thereafter, the normal alternate actuation of the primary brake and clutch assembly is enabled in the manner described hereinabove. It will be understood that actuation of the auxiliary brake piston 104 is independent of the normal alternate actuation of the primary clutch and brake assemblies and is selectively actuable when it is desired to stop both output shaft and flywheel rotation.

Figure 4:
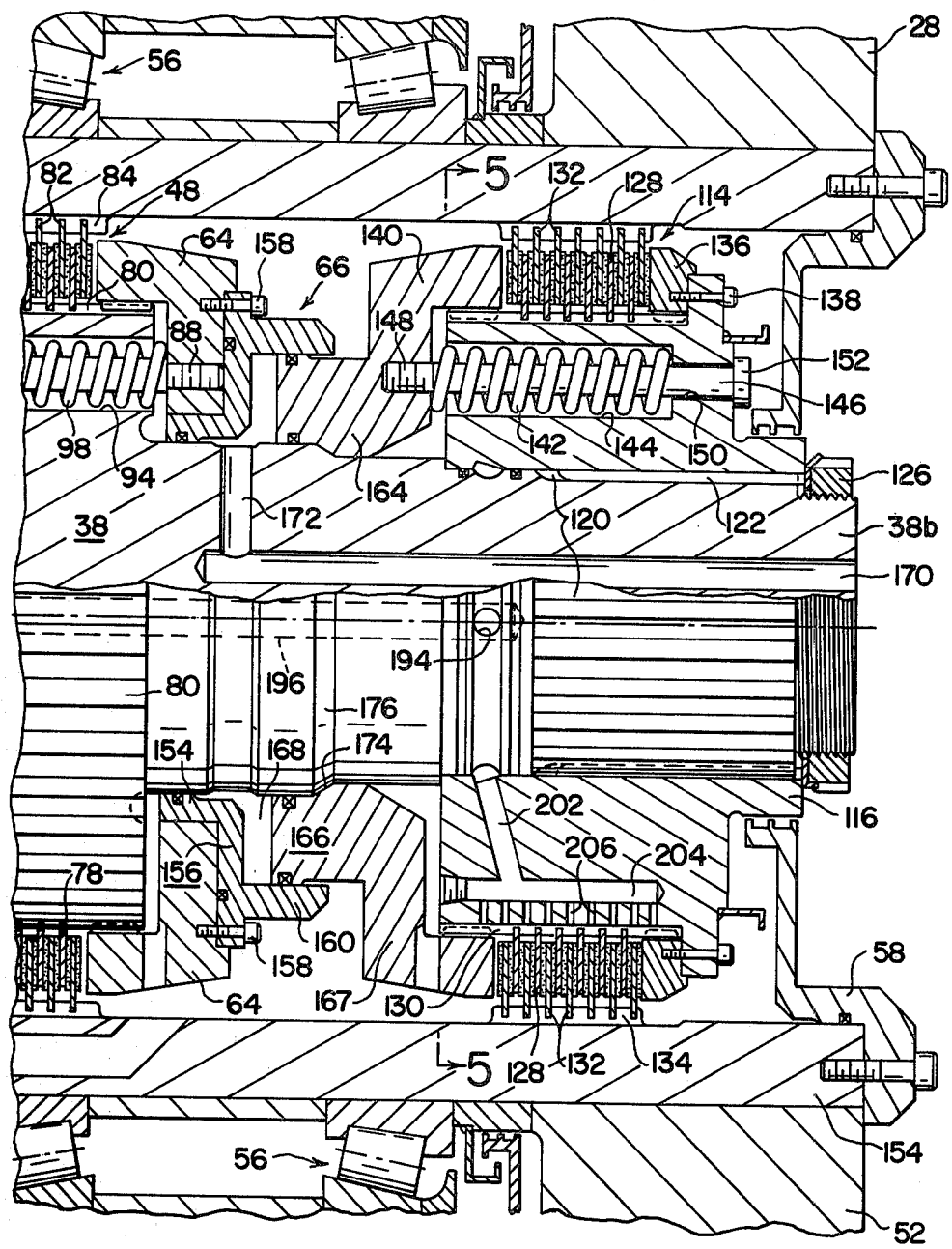
FIG. 4 is a detail view, in section, of the auxiliary clutch unit of the present invention mounted in the drive mechanism.
Figure 5:
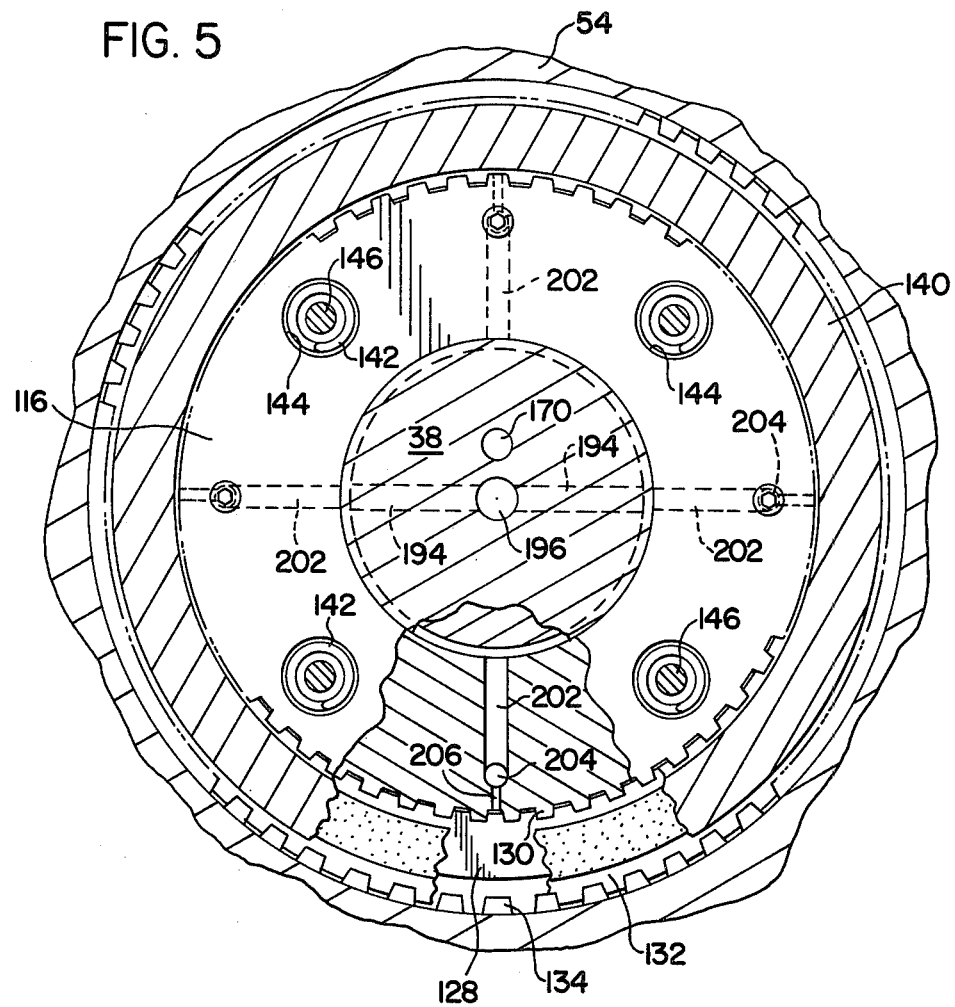
FIG. 5 is a cross-sectional view of the auxiliary clutch unit taken along line 5—5 in FIG. 4; and, FIG. 6 is a detail view, in section, similar to FIG. 4 and showing the basic drive mechanism with the auxiliary clutch removed.
Figure 6:
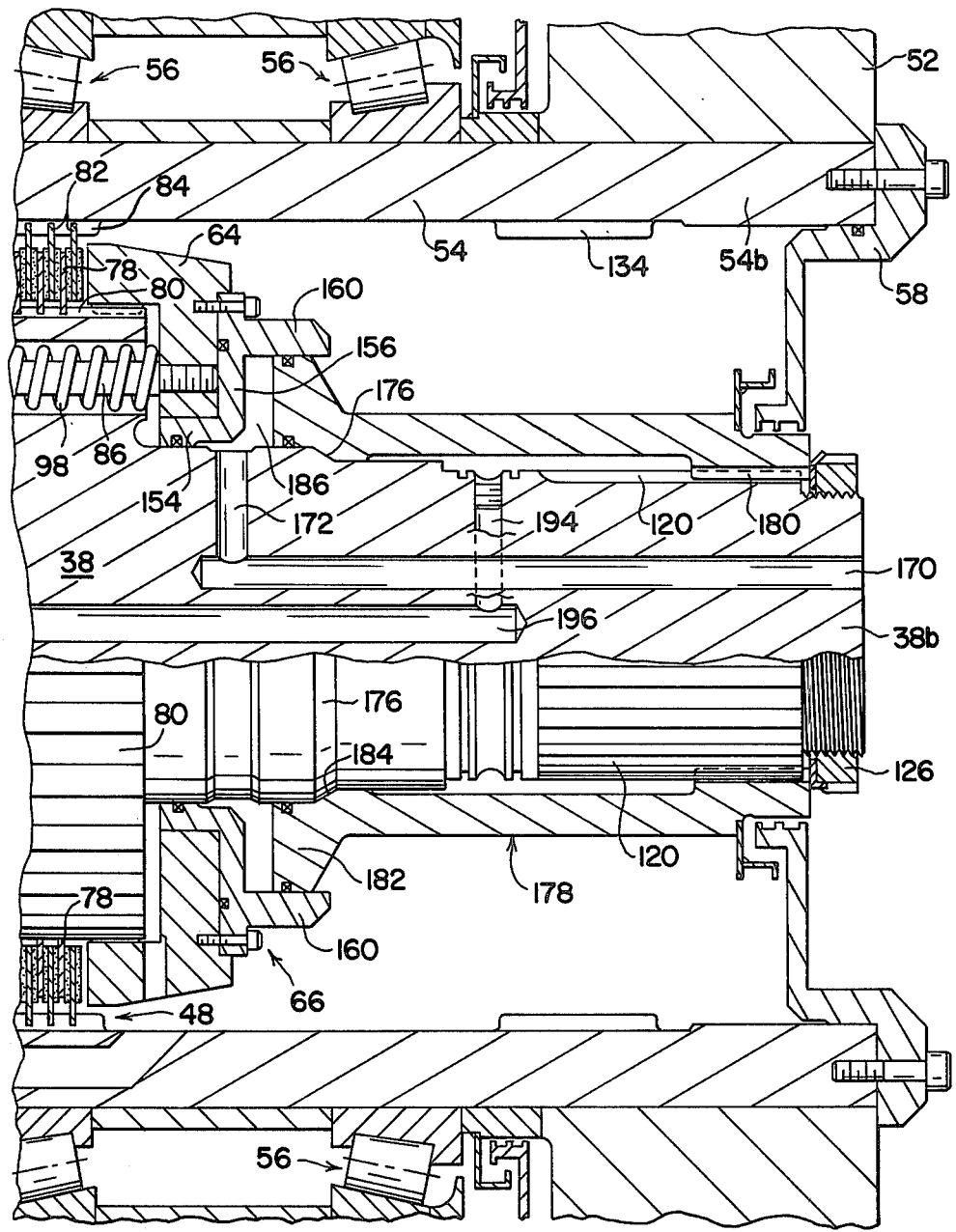

In accordance with the present invention, flywheel sleeve 54 has an axially inner end 54a interengaged with primary clutch discs 82 and an axially outer portion 54b overlying a corresponding axially outer portion 38b of shaft 38. Moreover, the axially outer portion 54b of sleeve 54 is radially spaced from shaft portion 38b to define a chamber 112 extending circumferentially about shaft 38 and adapted to selectively and removably receive an auxiliary clutch assembly 114. As best seen in FIGS. 4–6 of the drawing, clutch assembly 114 includes an annular support member 116 axially slidably received on end 38b of shaft 38. More particularly, shaft portion 38b is provided with splines 120 and the inner surface of member 116 is provided with splines 122 interengaging support member 116 with shaft 38 against rotation relative thereto. Further, shaft portion 38b is provided with an annular shoulder 124 engaged by the inner end of support member 116 to axially position the latter on the shaft, and the support member is axially retained on the end of shaft 38 by means of a retaining nut 126 threaded on the outer extremity of the shaft.

Auxiliary clutch assembly 114 further includes a plurality of auxiliary clutch discs 128 axially slidably interengaged with the outer surface of support member 116 by means of splined interconnections 130, and a plurality of auxiliary clutch discs 132 interposed between discs 128 and axially slidably interengaged with flywheel sleeve 54. In this respect, inner surface of outer portion 54b of flywheel sleeve 54 is provided with splines 134, and the outer peripheries of auxiliary clutch discs 132 are notched to receive splines 134. Accordingly, it will be appreciated that the auxiliary clutch discs are cooperatively supported by the flywheel and output shaft 38. The auxiliary clutch assembly further includes an auxiliary abutment plate 136 suitably mounted on support member 116 such as by a splined interengagement therewith and by means of mounting bolts 138. Auxiliary abutment plate 136 is on the axially outer end of support member 116, and an auxiliary clutch disc presser member 140 is received on support member 116 adjacent the axially inner end thereof. Presser member 140 is supported by support member 116 for axial displacement relative thereto toward and away from auxiliary abutment plate 136. More particularly, auxiliary presser member 140 is an annular member having a splined interengagement with support member 116, whereby presser member 140 is axially displaceable relative to support member 116 and is restrained against rotation relative thereto. Auxiliary clutch discs 128 and 132 are disposed between abutment plate 136 and presser member 140, and presser member 140 is displaceable toward abutment member 136 to engage the auxiliary clutch as set forth more fully hereinafter. Presser member 140 is biased away from abutment member 136 by means of a plurality of springs 142, thus to disengage the auxiliary clutch. Springs 142 are disposed in recesses 144 in support member 116 and have inner ends engaging shoulders at the inner ends of recesses 144 and outer ends engaging presser member 140. Further, a guide rod 146 extends through each recess 144 and has an outer end 148 threadedly engaged or otherwise secured to presser member 140. The inner end of each rod extends through an opening 150 in support member 116 and is provided with a head 152 engaging the axially outer face of the support member for the purpose set forth hereinafter.

As mentioned hereinabove, a cylinder member 66 is attached to the axially outer end of primary clutch presser member 64. In the embodiment shown, cylinder member 66 includes a circumferential sleeve portion 154 axially slidably engaging shaft 38, a radially outwardly extending wall 156 attached to primary clutch presser member 64 by bolts 158, and an axially extending sleeve portion 160 which is radially spaced from shaft 38. Auxiliary clutch presser member 140 includes a radially inwardly extending wall portion 167 and an axially extending circumferential sleeve portion 164. Sleeve portion 164 provides an annular piston 166 axially slidably received between shaft 38 and sleeve portion 160 of cylinder member 66. Cylinder member 66, shaft 38 and piston 166 cooperatively define a chamber 168 for receiving fluid under pressure. For this purpose, shaft 38 is provided with an axially extending passageway 170 and a plurality of radially extending passageways 172 opening into chamber 168 from passageway 170. The axially outer end of passageway 170 is adapted to be connected to a suitable source of hydraulic or pneumatic fluid under pressure, not shown.

Springs 142 of the auxiliary clutch assembly bias auxiliary clutch presser member 140 axially inwardly of shaft 38 and away from auxiliary abutment plate 136 and, accordingly, bias piston 166 axially inwardly of shaft 38 and cylinder member 66. The axially inner position of piston 166 and thus presser member 140 with respect to shaft 38 and abutment plate 136 can be established by engagement of heads 152 of rods 146 with support member 116. Preferably, however, such positioning of the piston is established by contouring the inner surface of sleeve portion 164 of presser member 140 to provide a tapered shoulder 174 thereon engaging a tapered shoulder 176 on shaft 38, as shown in FIG. 4. The axially outer position of cylinder member 66 relative to shaft 38 and primary abutment member 40 is of course established by the spring biased engagement of primary brake presser member 62 with the primary brake discs in the direction toward primary abutment plate 40.

When auxiliary clutch assembly 114 is in chamber 112 as shown in FIG. 4, the primary clutch and brake assemblies are alternately actuated as previously described to achieve the corresponding clutching and braking functions, and the auxiliary clutch assembly is engaged and disengaged simultaneously with engagement and disengagement of the primary clutch assembly. In this respect, with the component parts in the positions shown in FIG. 4 the fluid pressure in chamber 168 is released and the primary brake is engaged through the biasing force of springs 98 which force the primary brake presser member 62 against the primary brake discs in the direction toward primary abutment member 40. Springs 98 also bias primary clutch presser member 64 in the direction away from primary abutment member 40 to release the primary clutch, and auxiliary clutch springs 142 displace auxiliary clutch presser member 140 away from auxiliary abutment plate 136 to release the auxiliary clutch. Accordingly, flywheel 28 rotates relative to housing 24 and shaft 38, and the shaft is braked against rotation relative to the housing. By introducing hydraulic or pneumatic fluid under pressure into chamber 168 between cylinder member 66 and piston 166, cylinder member 66 is displaced axially of shaft 38 toward primary abutment plate 40 and piston 166 is simultaneously displaced axially of shaft 38 toward auxiliary abutment plate 136. Such displacement of cylinder member 66 displaces primary brake presser member 62 away from primary abutment member 40 to release the primary brake and displaces primary clutch presser member 64 toward primary abutment member 40 to engage the primary clutch. The simultaneous displacement of piston 166 axially outwardly of shaft 38 displaces auxiliary clutch presser member 140 toward auxiliary abutment plate 136 to engage the auxiliary clutch. Accordingly, shaft 38 is released for rotation relative to housing 24, and rotation of flywheel 28 is imparted to shaft 38 through the primary and auxiliary clutch assemblies. Upon release of the hydraulic or pneumatic fluid pressure in chamber 168, biasing springs 98 and 142 operate to displace the corresponding primary and auxiliary clutch presser members to the positions shown in FIG. 4, thus to simultaneously release the primary and auxiliary clutches. At the same time, springs 98 bias the primary brake presser member 62 toward primary abutment plate 40 to re-engage the primary brake.

Auxiliary clutch assembly 114 is removable as a unit from chamber 112 and is removed when a lower output torque capacity is desired. Removal of the auxiliary clutch assembly is quickly and easily accomplished merely by removing flywheel retaining ring 58 and retaining nut 126 on the end of shaft 38 and sliding the assembly axially outwardly of chamber 112. It will be noted that piston 166 in the embodiment shown is an integral part of the auxiliary clutch presser member and thus is removed therewith. During removal of the clutch assembly, heads 152 on rods 146 engage support member 116 to retain auxiliary presser member 140 in assembled relationship therewith, thus to avoid separation of the component parts of the clutch assembly while it is being handled. To install the auxiliary clutch assembly in chamber 112 only requires aligning shaft and support member splines 120 and 122 and aligning the notches in the outer peripheries of auxiliary clutch discs 132 to receive splines 134 on the inner surface of flywheel sleeve 54. Once the assembly is introduced into chamber 112 for support member 116 to engage shoulder 124 of shaft 38, the assembly is quickly completed by applying retaining nut 126 to the end of shaft 38 and retaining ring 58 to flywheel sleeve 54.

When auxiliary clutch unit 114 is removed to provide the lower output torque capacity for the drive mechanism, an auxiliary sleeve member 178 is mounted on shaft 38 as shown in FIG. 6 of the drawing for cooperation with cylinder member 66 to enable hydraulic or pneumatic operation of the primary clutch and brake assemblies. As will be seen in FIG. 6, sleeve 178 has an axially outer end provided internally with splines 180 cooperatively interengaging with splines 120 on shaft 38 to prevent rotation of sleeve 178 relative to the shaft. Further, the axially inner end of sleeve 178 provides a piston 182 received in the space between sleeve portion 160 of cylinder member 66 and the outer surface of shaft 38. The inner surface of the axially inner end of sleeve 178 is contoured to provide a tapered shoulder 184 which interengages with shoulder 176 of shaft 38 to axially position sleeve 178 relative to the shaft, and retaining nut 126 engages the axially outer end of sleeve 178 to prevent axial displacement of the sleeve relative to the shaft. Piston 182 is thus axially positioned to define a chamber 186 with cylinder member 66 and shaft 38 and which chamber is adapted to receive hydraulic or pneumatic fluid under pressure through passageways 170 and 172 as described hereinabove. It will be appreciated that the introduction of fluid under pressure into chamber 186 causes displacement of cylinder member 66 and thus primary clutch presser member 64 axially of shaft 38 in the direction toward the primary abutment plate, whereby the primary clutch and brake assemblies are adapted to be alternately actuated in the manner described hereinabove.

In the preferred embodiment herein illustrated and described, the drive mechanism is liquid cooled and lubricated by circulating a suitable liquid, such as oil, through the housing to lubricate and cool the operating parts thereof including the brake and clutch components. For this purpose, as shown in FIGS. 2-4 and 5, housing 24 is provided with an inlet passage 188 connectable to a suitable source of cooling and lubricating fluid. Passage 188 opens within housing 24 radially of shaft 38, and the shaft is provided with radial passages 190, 192 and 194 interconnected by an axial passage 196, whereby the lubricating and cooling fluid is distributed within the housing to the various components of the assembly including the primary brake and clutch assemblies and the auxiliary clutch assembly. More particularly, radial passages 192 open into axially extending passages 198 in the intermediate portion of the shaft underlying the primary brake and clutch assemblies and communicating therewith through a plurality of radial passages 200. Similarly, radial passages 194 communicate with radial passages 202 and axially extending passages 204 in support member 116 of the auxiliary clutch assembly, which passages 204 underlie the auxiliary clutch discs and communicate therewith through radially extending passages 206. When the auxiliary clutch assembly is removed from chamber 112 and auxiliary sleeve 178 is inserted therein, radial passages 194 in shaft 38 are suitably plugged or closed to prevent the flow of fluid into the area between shaft 38 and sleeve 178. To complete the circulating system, housing 24 is further provided with a sump area 208 and an outlet passage 210 for the cooling and lubricating fluid, whereby the fluid can be circulated through the device and cooled exteriorly thereof if desired.

It will be appreciated from the foregoing description that the drive mechanism can be readily modified to selectively provide different output torque capacities for the mechanism. It will be further appreciated that the auxiliary clutch unit is a preassembled unitary structure adapted to be quickly inserted into or removed from chamber 112 at the flywheel end of the drive mechanism without modifying the basic structure of the drive mechanism or altering the size thereof.

While considerable emphasis has been placed on the structure of the preferred embodiment herein illustrated and described, it will be appreciated that many changes can be made in the structures and structural interrelationships shown without departing from the principles of the present invention. In this respect, for example, piston 166 of the auxiliary clutch unit can be a separate component suitably attached to auxiliary presser member 140 as opposed to being formed integrally therewith, and cylinder 66 could be formed integrally with primary clutch presser member 64 as opposed to being a separate component attached thereto. Further, the piston and cylinder arrangement can be reversed for the cylinder member to be associated with the auxiliary clutch presser member and the piston with the primary clutch presser member. In the latter case, the auxiliary sleeve 178 would have its inner end configured to provide a cylinder member for cooperation with the piston on the primary clutch presser member. These and other changes will be suggested or obvious to those skilled in the art from the foregoing description of the preferred embodiment, as will other embodiments of the invention, whereby it is to be distinctly understood that the foregoing descriptive matter is to be interpreted merely as illustrative of the present invention and not as a limitation.

Having thus described the invention, it is claimed:

1. A press drive mechanism comprising a housing, shaft means extending through said housing and supported thereby for rotation about an axis, a flywheel at one end of said housing and including sleeve means extending axially inwardly of said housing about said shaft means and having axially inner and outer portions, means supporting said flywheel for rotation relative to said housing and shaft means, primary brake means between said housing and shaft means, primary clutch means between said shaft means and said axially inner portion of said sleeve means, said axially outer portion of said sleeve means surrounding an axial portion of said shaft means in radially spaced relationship therewith to define a circumferential chamber therewith, auxiliary clutch means between said axially outer portion of said sleeve means and said axial portion of said shaft means, said auxiliary clutch means including support means removably mountable in said chamber and carrying auxiliary clutch disc means and auxiliary clutch disc presser means and abutments means for removal therewith as a unit from said chamber, and brake and clutch operating means to alternately engage said primary brake means and said primary clutch means and to simultaneously engage said primary and auxiliary clutch means when said auxiliary clutch means is in said chamber.

2. The press drive mechanism according to claim 1, wherein said support means is an annular member removably mounted on said axial portion of said shaft means for rotation with said shaft means.

3. The press drive mechanism according to claim 2, wherein said auxiliary clutch disc means are supported on said annular member between said auxiliary abutment means and auxiliary presser means, said operating means including means to displace said auxiliary presser means toward said auxiliary abutment means to engage said auxiliary clutch means, and means carried by said annular member biasing said auxiliary presser means away from said auxiliary abutment means.

4. The press drive mechanism according to claim 3, wherein said means to displace said auxiliary presser means toward said auxiliary abutment means includes fluid operated piston and cylinder means.

5. The press drive mechanism according to claim 4, wherein said piston and cylinder means includes axially interengaged piston and cylinder members surrounding said shaft means and axially displaceable in opposite directions relative thereto, one of said piston and cylinder members being displaced in one direction relative to said shaft means to displace said auxiliary presser means to engage said auxiliary clutch means, and the other of said piston and cylinder members being displaced in the opposite direction relative to said shaft means to simultaneously engage said primary clutch means.

6. The press drive mechanism according to claim 5, wherein said one of said piston and cylinder members is connected to said auxiliary presser means for removal from said chamber with said auxiliary clutch means.

7. The press drive mechanism according to claim 6, wherein said one of said piston and cylinder members is said piston member.

8. The press drive mechanism according to claim 6, and auxiliary sleeve means removably receivable in said chamber upon removal of said auxiliary clutch means and in auxially fixed relationship with respect to said shaft means, said sleeve means including means cooperable with said other of said piston and cylinder members for said other member to be displaceable in said opposite direction relative to said shaft means.

9. The press drive mechanism according to claim 1, wherein said brake and clutch operating means includes fluid operated piston and cylinder means on said shaft means between said primary and auxiliary clutch means.

10. The press drive mechanism according to claim 9, wherein said piston and cylinder means includes axially interengaged annular piston and cylinder members surrounding said shaft means and supported thereby for axial displacement in opposite directions relative thereto, one of said members being connected to said primary clutch means and the other to said auxiliary clutch means for said displacement in said opposite directions to simultaneously engage said primary and auxiliary clutch means.

11. The press drive mechanism according to claim 10, wherein said other member is said piston member.

12. The press drive mechanism according to claim 11, wherein said piston member is removable from said chamber with said auxiliary clutch means, and auxiliary sleeve means removably receivable in said chamber when said auxiliary clutch means is removed, said sleeve means including piston means received in said cylinder member.

13. A press drive mechanism comprising, a housing, shaft means extending through said housing and having opposite ends, bearing means within said housing supporting said shaft means for rotation relative to said housing about an axis, a flywheel at one end of said housing and including sleeve means extending into the corresponding end of said housing, said sleeve means having axially inner and outer portions surrounding corresponding axially inner and outer portions of said shaft means, bearing means between said housing and sleeve means supporting said flywheel for rotation relative to said housing and shaft means, primary clutch discs cooperatively supported relative to said inner portion of said shaft means and said inner portion of said sleeve means, primary brake discs cooperatively supported relative to said housing and said shaft means, said primary brake discs being axially spaced from said primary clutch discs in the direction from said one end of the housing toward the other, primary abutment means fixed on said shaft means between said primary clutch and brake discs, axially opposed primary clutch and brake disc presser members movable in axially opposite directions to alternately displace said primary clutch discs and said primary brake discs in the corresponding direction toward said primary abutment means, means biasing said primary brake disc presser member toward said primary abutment means and said primary clutch disc presser member away from said primary abutment means and toward said one end of said housing, said axially outer portions of said flywheel sleeve means and said shaft means defining an annulr chamber, an auxiliary clutch unit removably mountable in said chamber on said outer portion of said shaft means and including auxiliary clutch discs cooperatively supported relative to said outer portion of said shaft means and said outer portion of said sleeve means, said auxiliary clutch unit further including auxiliary abutment means on the axially outer side of said auxiliary clutch discs and an auxiliary presser member on the axially inner side of said auxiliary clutch discs and displaceable to engage said auxiliary clutch discs with said auxiliary abutment means, said primary clutch disc presser member and said auxiliary presser member being axially opposed and displaceable in axially opposite directions to simultaneously engage said primary and auxiliary clutch discs with the corresponding one of said primary and auxiliary abutment means, and fluid operable piston and cylinder means between said primary and auxiliary clutch disc presser members to displace the latter said members in axially opposite directions, said piston and cylinder means including a piston member and a cylinder member, one of said piston and cylinder members being connected to said auxiliary presser member for removal from said chamber with said auxiliary clutch unit.

14. The press drive mechanism according to claim 13, wherein said auxiliary clutch unit further includes auxiliary biasing means biasing said auxiliary presser member in the direction away from said auxiliary abutment means, and said one of said piston and cylinder members and said shaft means include stop means interengaging to limit movement of said auxiliary presser member away from said auxiliary abutment means.

15. The press drive mechanism according to claim 14, wherein said piston and cylinder members are slidably supported on said shaft means and telescopically interengaged, said piston member being said one member connected to said auxiliary presser member.

16. The press drive mechanism according to claim 14, wherein said auxiliary clutch unit includes an annular support member removably interengaged with said axially outer portion of said shaft means for rotation with said shaft means, said annular member supporting said auxiliary clutch discs, auxiliary abutment means, auxiliary presser member, auxiliary biasing means and said one of said piston and cylinder members for removal therewith as a unit from said chamber.

17. The press drive mechanism according to claim 16, wherein said piston and cylinder members are slidably supported on said shaft means and telescopically interengaged, said piston member being said one member connected to said auxiliary presser member.

18. The press drive mechanism according to claim 17, and auxiliary sleeve means romovably receivable in said chamber on said outer portion of said shaft means upon removal of said auxiliary clutch unit, said shaft means and sleeve means including means interengaging to axially position said sleeve means on said shaft means, said sleeve means including piston means corresponding to said piston member and received in said cylinder member.

19. The press drive mechanism according to claim 13, and auxiliary sleeve means removably receivable in said chamber on said outer portion of said shaft means upon removal of said auxiliary clutch unit and in axially fixed relationship with respect to said shaft means, said sleeve means including means cooperable with the other of said piston and cylinder members for said other of said members to be displaceable to displace said primary clutch presser member in the corresponding one of said opposite directions.

20. The press drive mechanism according to claim 19, wherein said other of said piston and cylinder members is said cylinder member, and said means cooperable with said cylinder member is piston means on said sleeve means.

* * * * *